United States Patent

Sweeney et al.

[11] Patent Number: 5,628,927
[45] Date of Patent: May 13, 1997

[54] MARINE CARBURETOR ANTI-ICING APPARATUS

[75] Inventors: Mark E. Sweeney, Oshkosh; Paul H. Jennerjahn, Greenville, both of Wis.

[73] Assignee: Brunswick Corporation, Lake Forest, Ill.

[21] Appl. No.: 302,500

[22] Filed: Sep. 8, 1994

[51] Int. Cl.[6] .................... B60L 1/02; F02M 31/12
[52] U.S. Cl. .................. 219/207; 123/549; 261/138; 261/142; 261/DIG. 20
[58] Field of Search .................... 219/205–208; 123/543, 545, 547, 549, 557; 261/142, 138, DIG. 20

[56] References Cited

U.S. PATENT DOCUMENTS

| 2,287,593 | 6/1942 | Ball | 261/DIG. 20 |
|---|---|---|---|
| 2,603,199 | 7/1952 | Moseley | 261/DIG. 20 |
| 2,655,141 | 10/1953 | Hayden | 261/DIG. 20 |
| 2,715,520 | 8/1955 | Boyce | 261/DIG. 20 |
| 2,766,974 | 10/1956 | McConnell | 261/DIG. 20 |
| 3,246,841 | 4/1966 | Kling . | |
| 3,672,342 | 6/1972 | Ojala . | |
| 3,872,849 | 3/1975 | Chester et al. . | |
| 3,916,859 | 11/1975 | Fossum | 261/DIG. 20 |
| 4,108,953 | 8/1978 | Rocco | 261/142 |
| 4,356,804 | 11/1982 | Igashira et al. | 219/206 |
| 4,376,739 | 3/1983 | Passey, Jr. | 123/549 |
| 4,389,354 | 6/1983 | Endou et al. | 261/DIG. 20 |
| 4,465,053 | 8/1984 | Berg | 123/549 |
| 4,500,772 | 2/1985 | Ahner et al. | 219/205 |
| 4,717,808 | 1/1988 | Cyll et al. | 219/206 |
| 4,818,842 | 4/1989 | Walty | 219/205 |
| 5,186,133 | 2/1993 | Watanabe et al. . | |

FOREIGN PATENT DOCUMENTS

| 196961 | 11/1984 | Japan | 261/DIG. 20 |

Primary Examiner—Teresa J. Walberg
Assistant Examiner—Raphael Valencia
Attorney, Agent, or Firm—Andrus, Sceales, Starke & Sawall

[57] ABSTRACT

A carburetor anti-icing apparatus and method for a marine drive is provided for heating a carburetor to a temperature above that at which ice may form in the idle and progression circuits of the carburetor. Several heaters, heat sources, and methods are disclosed for heating the carburetor. In one embodiment an electrical heating element is mounted to the carburetor body near the fuel orifices which make up the idle and progression circuits. In another embodiment, engine cooling water is circulated through a heater housing mounted to the carburetor body. In yet a further embodiment, engine exhaust from the marine drive is conveyed through the heater housing mounted to the carburetor body. A thermally conductive gasket is used to improve heat transfer. The carburetor anti-icing apparatus and method also improves low speed running performance due to the improved fuel vaporization resulting from the increased temperature in the progression circuit.

4 Claims, 3 Drawing Sheets

MARINE CARBURETOR ANTI-ICING APPARATUS

BACKGROUND OF THE INVENTION

The invention relates to marine drives, and more particularly to an apparatus and method for preventing ice build-up in the carburetor of a marine drive.

Carburetor icing is a problem that may occur when a marine drive is operated in cooler ambient temperatures combined with high moisture content in the air which may be the result of high humidity or the splash and mist of operating the marine drive in water. When the carburetor mixes fuel and air under such conditions, ice may form over, or in, the small holes which make up the idle and off-idle circuits of the carburetor. Carburetor icing can occur in ambient temperatures above the freezing point of water due to the cooling effects of the carburetor venturi and the evaporative cooling effect of the fuel in the carburetor. The formation of ice particles in and around the carburetor circuit holes results in a malfunction of the air/fuel delivery circuit of the carburetor, thereby causing poor performance, and in severe cases, stalling of the engine.

The addition of a water disbursing additive to the fuel is ineffective in preventing carburetor icing in marine drives because the source of the water is in the air that the marine drive operates-not the fuel. Since a marine drive inherently operates under high moisture conditions, operating in cooler ambient temperatures, or when an unexpected drop in temperature occurs, could strand an operator in the middle of a body of water. Further, once carburetor icing occurs, the operator has very limited options available because the presence of a flammable fuel in the carburetor limits the application of heat sources to thaw the carburetor icing. Therefore, a method and apparatus to prevent carburetor icing is highly desirable in marine drives.

SUMMARY OF THE INVENTION

The present invention provides a solution to carburetor icing by providing an anti-icing apparatus and method suitable for a marine drive. The invention involves heating the carburetor body in the area of the idle and off-idle (progression) circuits to a temperature above that at which ice will form. This prevents the formation of ice in and over the holes which form the idle and progression circuits. A further benefit of heating the carburetor results in improved fuel vaporization which in turn improves the low speed performance of the marine drive.

Several embodiments are disclosed to accomplish the carburetor anti-icing of the present invention. In one embodiment, a means for heating the carburetor to a temperature above that at which ice forms comprises an electronic heating element mounted to the carburetor body using a thermally conductive gasket such that the heat produced by the electronic heating element is transferred to the carburetor body to prevent the formation of ice in, or over the holes which form the idle and progression circuits. The electronic heating element may be a positive temperature coefficient (PTC) thermistor or a resistive heating element.

Another embodiment comprises a means for heating the carburetor comprising a heater housing having an inlet and an outlet connected to the engine cooling system such that warm water is routed from a liquid cooled marine drive engine to the heater housing thereby warming the heater housing and the carburetor.

Yet a further embodiment comprises a means for heating the carburetor comprising a heater housing having an inlet and an outlet to convey engine exhaust from the marine drive engine to the inlet and through the heater housing. The outlet of the heater housing is connected to the exhaust system of the marine drive. In this manner, heat from the exhaust is transferred to the heater housing, through the thermally conductive gasket, and to the carburetor body thereby preventing the formation of ice in or near the idle and/or progression circuits of the carburetor.

Alternatively, any of the prior mentioned embodiments may be incorporated directly into the carburetor body during manufacture of the carburetor.

Additional benefits and advantages of the present invention will become apparent from the subsequent detailed description of the preferred embodiment, the drawings, and the claims.

DETAILED DESCRIPTION OF THE PREFERRED EMBODIMENT

Figure 1:
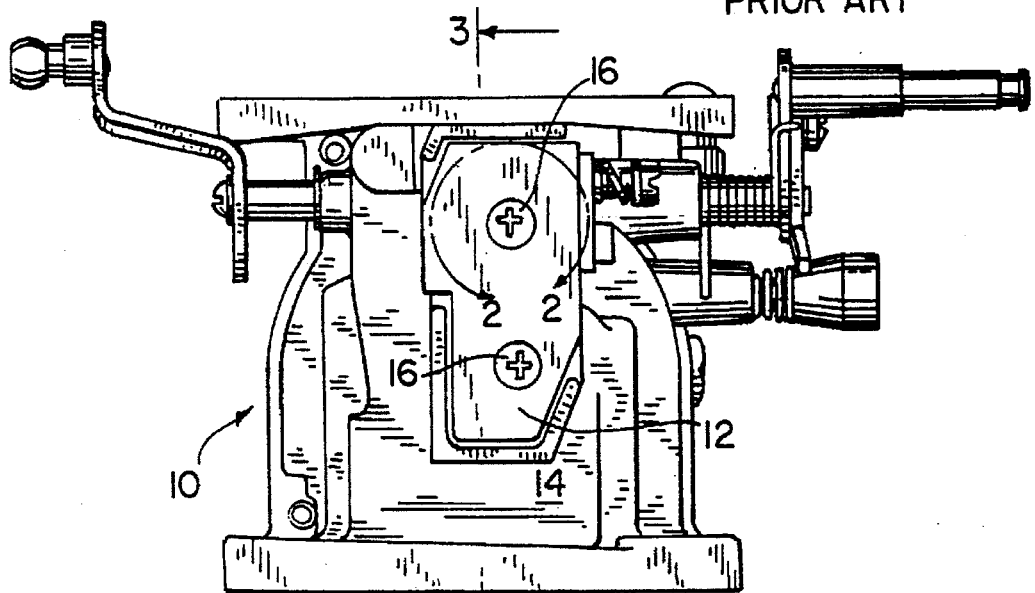
FIG. 1 shows a typical marine drive carburetor.

FIG. 1 shows carburetor 10 for a marine drive having a progression circuit cover 12 mounted to the carburetor body 14 by fastening screws 16.

Figure 2:
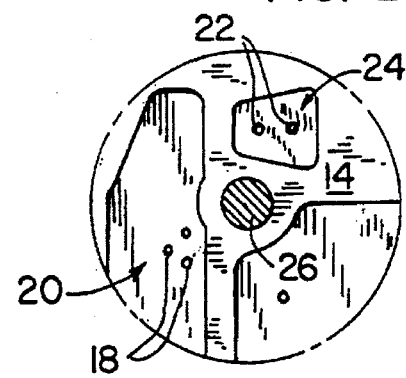
FIG. 2 is a detailed sectional view taken along line 2—2 of FIGS. 1, 4, and 6.

FIG. 2 is a detailed view of carburetor 10 having progression circuit cover 12 removed. Fuel orifices 18 comprise a progression circuit 20 for the transfer of fuel in off-idle conditions. Fuel orifices 22 comprise idle circuit 24 for transferring fuel under idle conditions. Hole 26 receives fastener 16, FIG. 1.

Figure 3:
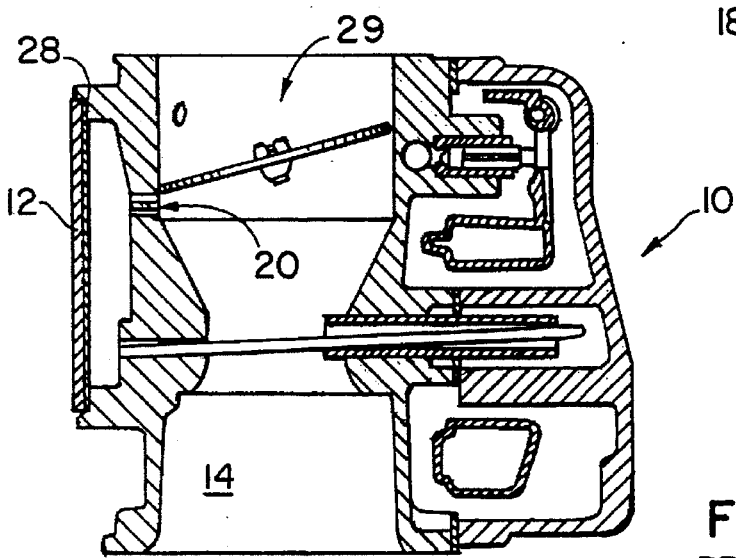
FIG. 3 is a sectional view taken along line 3—3 of FIG. 1.

FIG. 3 is a sectional view taken along line 3—3 of FIG. 1 and shows progression circuit cover 12, gasket 28 and progression circuit 20 leading to throat 29.

Figure 4:
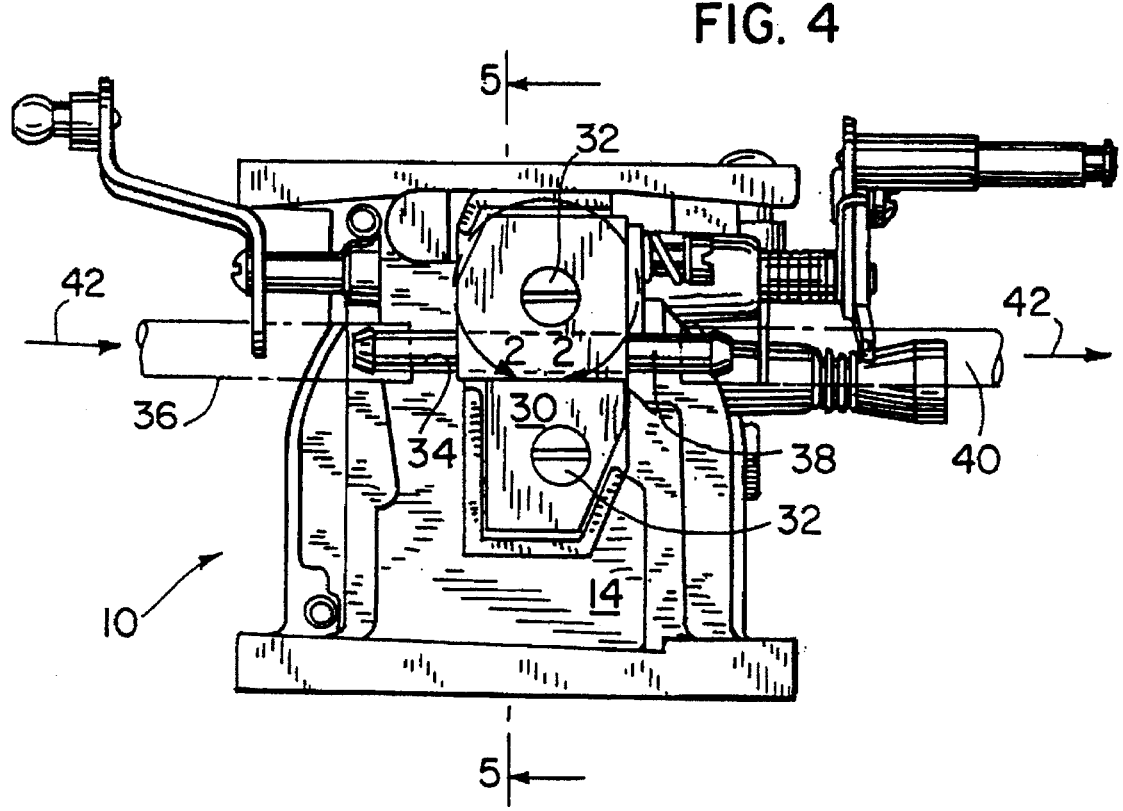
FIG. 4 shows a marine drive carburetor in accordance with the present invention.
Figure 5:
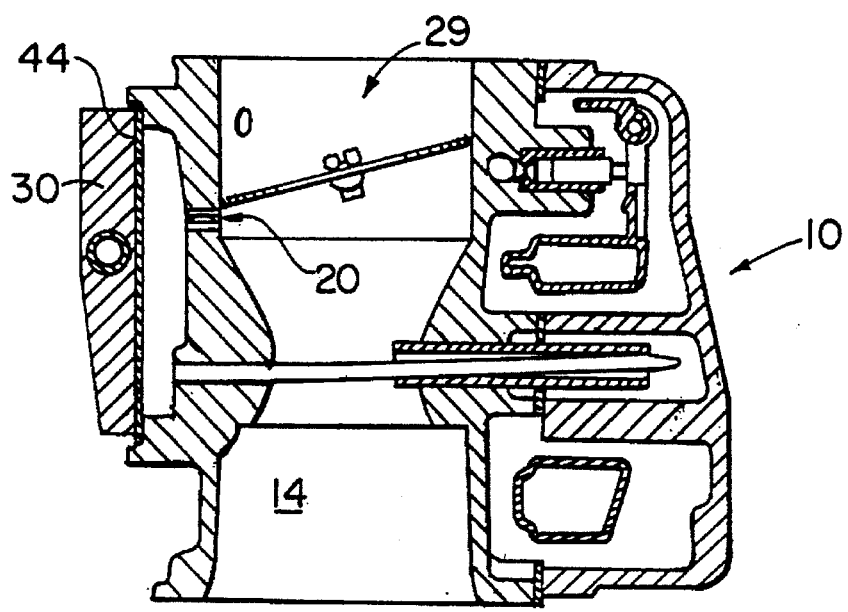
FIG. 5 is a sectional view taken along line 5—5 of FIG. 4.

FIG. 4 shows a means for heating carburetor 10 comprising a heater housing 30 mounted to carburetor body 14 by fasteners 32. Heater housing 30 has inlet 34 for receiving supply line 36, and outlet 38 for receiving return line 40. As indicated by arrows 42, a heating medium is conveyed through supply line 36, into inlet 34, through heater housing 30, out outlet 38, and through return line 40 such that at least a portion of the heat in the heating medium is transferred to heater housing 30 which is mounted to carburetor body 14 such that the heat transferred to heater housing 30 is further transferred to carburetor body 14 to heat the area of fuel orifices 18 and 22, FIG. 2. A thermally conductive gasket 44, FIG. 5, is placed between heater housing 30 and carburetor body 14 for improved heat transfer. The heating medium used to pass through heater housing 30, FIG. 4, at 42 maybe either engine cooling liquid or engine exhaust from the marine drive. In either case, although the heater housing 30 is shown as an add-on item to carburetor 10, it maybe manufactured integrally with carburetor body 14.

Figure 6:
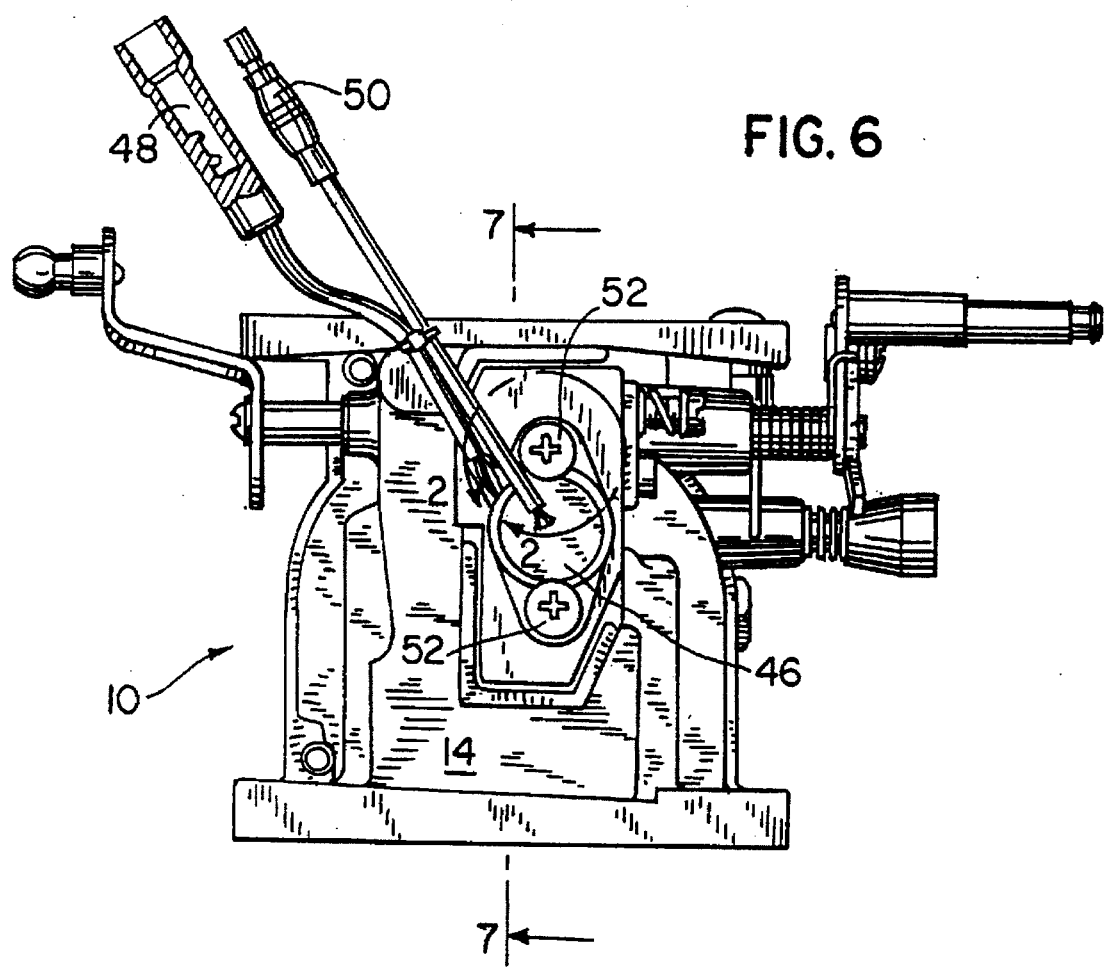
FIG. 6 shows a marine drive carburetor in accordance with a further embodiment of the present invention.
Figure 7:
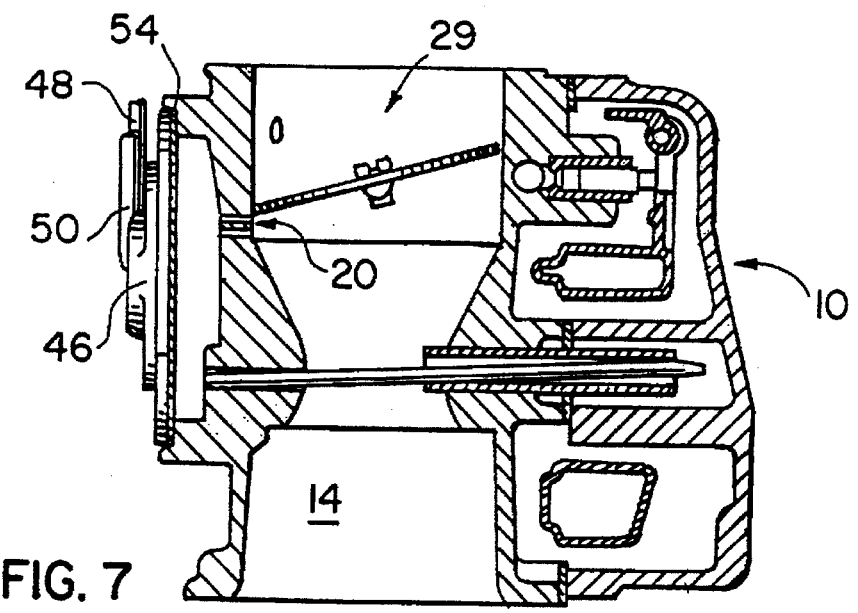
FIG. 7 is a sectional view taken along line 7—7 of FIG. 6.

FIG. 6 shows a means for heating carburetor 10 comprising an electrical heating element 46 having a battery voltage lead 48 to be connected to a battery voltage, and a battery ground lead 50 to be connected to a battery ground. Preferably, electrical heating element 46 is a positive temperature coefficient (PTC) thermistor which has the added benefit of varying the heat produced according to the ambient temperature. In other words, a PTC thermistor will automatically increase energy consumption and therefore produce increased heat, as the ambient temperature decreases. Conversely, after the temperature of carburetor body 14 increases, the PTC thermistor 46 will reduce energy consumption and produce less heat. Alternatively, electrical heating element 46 may comprise a typical resistive heating element. Electrical heating element 46 is mounted to carburetor body 14 with fasteners 52. Thermally conductive gasket 54, FIG. 7, is Situated between electrical heating element 46 and carburetor body 14 to improve heat transfer in the area of fuel orifices 18 and 22, FIG. 2.

Generally, electrical heating element 46, FIG. 6, and heater housing 30, FIG. 4, whether implemented with engine exhaust or engine cooling liquid, are carburetor heaters. The present invention further includes a method of retrofitting a marine drive carburetor by replacing progression circuit cover 12, FIG. 1, and gasket 28, FIG. 3, with a carburetor heater 30, FIGS. 4, or 46, FIG. 6, and a thermally conductive gasket 44, FIGS. 5, or 54, FIG. 7, and connecting a source of heat, whether electrical, engine exhaust, or engine cooling liquid.

If heater housing 30 is connected to engine cooling liquid, supply line 36 is connected between inlet 34 and the liquid cooled engine. Return or discharge line 40 is connected between outlet 38 and either the liquid cooled engine in closed cooling systems, or simply discharged in open cooling systems. If heater housing 30 is connected to engine exhaust, supply line 36 is connected from the marine engine to inlet 34, and return line 40 is connected between outlet 38 and the exhaust system of the marine drive.

It is recognized that various equivalents, alternatives, and modifications are possible within the scope of the appended claims.

We claim:

1. A carburetor anti-icing apparatus for a marine drive carburetor having an idle circuit and a progression circuit, the apparatus comprising a means for heating idle and progression circuits of a marine drive carburetor to a temperature above that at which ice forms, wherein the heating means is mounted to a side of the marine drive carburetor adjacent a set of multiple small fuel orifices that comprise the idle and progression circuits, wherein the means for heating is further defined to comprise a heater housing having an inlet and an outlet to convey heating medium through the heater housing such that at least a portion of heat in the heating medium is transferred to the heater housing which is mounted to a carburetor such that the transfer heat is further transferred to the carburetor body and wherein the heating medium does not come into direct contact with the orifices.

2. The apparatus of claim 1 wherein the heating medium is cooling liquid from a liquid cooled marine drive.

3. The apparatus of claim 1 wherein the heating medium is engine exhaust.

4. The method of claim 1 wherein a thermally conductive gasket is mounted between the heater housing and the carburetor.

* * * * *